(12) United States Patent
I et al.

(10) Patent No.: US 8,915,394 B2
(45) Date of Patent: Dec. 23, 2014

(54) WATERPROOF BOX WITH TINY AND BLIND PASSAGES

(75) Inventors: Sunsoku I, Kakegawa (JP); Yasuhito Suzuki, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/376,990

(22) PCT Filed: Jun. 9, 2010

(86) PCT No.: PCT/JP2010/059750
§ 371 (c)(1),
(2), (4) Date: Dec. 8, 2011

(87) PCT Pub. No.: WO2010/143648
PCT Pub. Date: Dec. 16, 2010

(65) Prior Publication Data
US 2012/0085766 A1 Apr. 12, 2012

(30) Foreign Application Priority Data
Jun. 11, 2009 (JP) .................................. 2009-140265

(51) Int. Cl.
*B65D 43/16* (2006.01)
*H02G 3/08* (2006.01)
*B60R 16/023* (2006.01)

(52) U.S. Cl.
CPC ............ *H02G 3/088* (2013.01); *B60R 16/0239* (2013.01)
USPC ........................................................... 220/378

(58) Field of Classification Search
CPC .... B65D 11/105; B65D 43/16; H05K 5/0013; H05K 5/0247; H02G 3/14; H01L 23/057; F01P 11/0214

USPC ..................................... 220/3.8, 810, 378, 796
See application file for complete search history.

(56) References Cited

U.S. PATENT DOCUMENTS

| 4,166,548 A | * | 9/1979 | Crisci ........................... 220/795 |
| 5,310,075 A | | 5/1994 | Wyler |

(Continued)

FOREIGN PATENT DOCUMENTS

| JP | 09-216648 A | 8/1997 |
| JP | 2000-004521 A | 1/2000 |

(Continued)

OTHER PUBLICATIONS

International Search Report dated Sep. 7, 2010, issued for PCT/JP2010/059750.

(Continued)

*Primary Examiner* — Anthony Stashick
*Assistant Examiner* — Jennifer N Zettl
(74) *Attorney, Agent, or Firm* — Edwards Wildman Palmer LLP

(57) ABSTRACT

When cleaning water hits a lower wall 33*h* of a first waterproof portion 33 of an upper cover 15, and the water is thrown up to the upper cover 15, a tapered outer wall 30*b* of the first waterproof portion 30 and a tapered inner wall 33*g* of the first waterproof portion 33 come into contact with each other, and are engaged with each other to close an entrance side of a tiny passage 27. Even if the water enters, the water enters a blind passage 33*b* to reduce the force of the water. The water of which force is reduced falls down. It is effective for improving waterproof performance to reduce the force of the water by the blind passage 33*b*.

17 Claims, 12 Drawing Sheets

(56) References Cited

U.S. PATENT DOCUMENTS

| | | | |
|---|---|---|---|
| 7,077,281 B2 * | 7/2006 | Sato et al. | 220/3.8 |
| 8,210,378 B2 * | 7/2012 | Takeuchi et al. | 220/4.02 |
| 8,785,775 B2 * | 7/2014 | Takeuchi et al. | 174/67 |
| 8,813,984 B2 * | 8/2014 | Satoh et al. | 220/4.21 |
| 2002/0084271 A1 * | 7/2002 | Sato et al. | 220/3.8 |
| 2010/0127012 A1 * | 5/2010 | Takeuchi et al. | 220/810 |
| 2012/0097693 A1 * | 4/2012 | Takeuchi et al. | 220/810 |

FOREIGN PATENT DOCUMENTS

| | | | | |
|---|---|---|---|---|
| JP | 2000004521 A | * | 1/2000 | |
| JP | 2000-115955 A | | 4/2000 | |
| JP | 2000115955 A | * | 4/2000 | |
| JP | 2000-316219 A | | 11/2000 | |
| JP | 2000316219 A | * | 11/2000 | |
| JP | 2001-072116 A | | 3/2001 | |
| JP | 2006-266300 A | | 10/2006 | |
| JP | 2006266300 A | * | 10/2006 | |

OTHER PUBLICATIONS

Office Action dated Dec. 18, 2013 in connection with Chinese application No. 201080031342.X, with English translation.

European Search Report issued Feb. 13, 2014 in connection with European Application No. 10786179.1.

\* cited by examiner

WATERPROOF BOX WITH TINY AND BLIND PASSAGES

CROSS REFERENCE TO RELATED APPLICATIONS

This application is related to three co-pending applications, all entitled, "WATERPROOF BOX" filed concurrently herewith, in the names of Kunihiko TAKEUCHI and Hiroaki YAMADA as a national stage application of International Application No. PCT/JP2010/059703, filed Jun. 8, 2010; in the names of Kunihiko TAKEUCHI and Hiroaki YAMADA as a national stage application of International Application No. PCT/JP2010/059702, filed Jun. 8, 2010; and in the names of Kouki SATOH and Noriaki AKAMINE as a national stage application of International Application No. PCT/JP2010/059751, filed Jun. 9, 2010; which co-pending applications are assigned to the assignee of the instant application and also incorporated by reference herein.

TECHNICAL FIELD

This invention relates to a waterproof box waterproofed by overlapping a waterproof structure portion of a box main body with a waterproof structure portion of a cover.

BACKGROUND

Typically, electrical junction boxes that are mounted within an engine compartment of a vehicle often include: a connecting components such as a wiring harness; electronic components such as relays, fuses, or the like; and electric equipment such as an electric control unit. Therefore, when a vehicle is operating in the rain, or when an engine compartment is washed under high pressure, it is necessary to prevent water from being splashed onto an inside of the electrical junction box. Therefore, these electrical junction boxes are waterproofed by providing respectively waterproof structures to a box main body receiving the electric components and the like, and to a cover covering an upper opening of the box main body. As such, the electrical junction box is a waterproof box.

Regarding the waterproof box, it is known that these waterproof boxes may be waterproofed by for example providing a packing between the waterproof structure portion of the box main body and the waterproof structure portion of the cover (for example, see Patent Document 1 listed below), or alternatively by overlapping the waterproof structure portion of the box main body with the waterproof structure portion of the cover without using any packing (for example, see Patent Document 2 listed below).

When using the packing, a gap is filled with the packing material that is disposed between both waterproof structure portions, thereby increasing the waterproofing performance. However, the number of components in this solution is increased due to the packing, and the cost of the waterproof box is increased due to the packing. Further, the man-hours for attaching the packing are increased as well. Therefore, in recent years, a packing-less type of waterproof box has been used.

As a packing-less type of waterproof box, a waterproof box disclosed in the Patent Document 2 includes: a box main body having an upper opening; and a cover covering the upper opening. This waterproof box is waterproofed by overlapping the waterproof structure portion of the box main body with the waterproof structure portion provided on a seam joint portion of the cover. Specifically, the waterproof structure portion at the box main body side includes a circular waterproof convex portion provided around an edge of a peripheral wall of the box main body. The waterproof structure portion at the cover side includes a circular waterproof concave portion provided around an edge of a peripheral wall of the cover.

According to the above configuration and the above structure, when the cover is disposed above the upper opening of the box main body, then moved straight downward, and the waterproof structure portions are overlapped with each other, the waterproof convex portion is inserted into the waterproof concave portion. Further, a U-shaped cover lock provided on the waterproof structure portion of the cover is caught by, and locked with a main body lock provided on the waterproof structure portion of the main body. As such, the box main body and the cover are in a locked state. The main body locks and the cover locks are arranged on at least two positions on left and right sides of the waterproof box (or front and rear sides). These two positions are separated from each other.

PRIOR ART DOCUMENT

Patent Document

Patent Document 1: JP, A, 2001-72116
Patent Document 2: JP, A, H09-216648

DISCLOSURE OF THE INVENTION

Problem to be Solved by the Invention

Packing-less type waterproof boxes are problematic as well. Namely, when a water jet pressure of the high pressure washing is too high, the water jetted toward the waterproof box hits the peripheral wall of the waterproof box, and then moves upward along the peripheral wall, and finally, passes through a slight gap between the waterproof structure portions overlapped with each other. As a result, a portion of the water gets inside the waterproof box.

Incidentally, in a case of the Patent Document 2 specifically, an inner wall is provided on an inside of the peripheral wall and on an inside of the waterproof structure portion. Therefore, even when the water gets inside the waterproof box, the inner wall prevents the water from being splashed onto the electric components or the like. However, some of the well-known many waterproof boxes are not provided with an inner wall (unable to be partially provided with an inner wall), and it is necessary to provide an effective countermeasure for the waterproof structure portions of the box main body and the cover.

Due to recent technology, aluminum electric wire is being used in these types of waterproof boxes. This aluminum electric wire can be problematic if it comes in contact at connection points with water. Therefore, it is especially important in these types of applications that waterproofing is improved.

Further, the current packing-less waterproof boxes are also problematic because when the locking component between the main lock and the cover lock is released, it is necessary to respectively release the locking components at least two positions. So, the present boxes are difficult to operate for a user. Also, since the locking conditions are released respectively at two positions, and the cover is removed, a large space above the waterproof box is needed in order to allow the use of both hands by the user. Incidentally, needless to say, these issues should also be addressed in solving the problems associated with the current packing-less waterproof boxes.

Accordingly, in view of the above condition, an object of the present invention is to provide a waterproof box able to improve waterproofing performance. Further, another object is to provide a waterproof box that is able to improve operability of the box and to save space.

Means for Solving the Problem

For attaining the object of the present invention, a waterproof box is provided that includes: a box main body having a peripheral wall and receiving components inside of the peripheral wall, the components being susceptive to moisture; a cover having a cover peripheral wall and covering an opening provided at an edge of the peripheral wall of the main body; a waterproof structure portion provided at the edge of the peripheral wall of the main body; and a waterproof structure portion provided at an edge of the cover peripheral wall of the cover.

More specifically, the waterproof box is waterproofed by the waterproof structure portions of the main body and of the cover overlapped with each other. The waterproof structure portion of the main body includes a mating surface, the waterproof structure portion of the cover includes a mating surface adapted to be brought into contact with the mating surface of the main body, and blind passages are provided on the mating surface of the waterproof structure portion of the cover, and the blind passages each having a space with a desired size, and the blind passages being provided at an intermediate position and/or a position near an entrance of a tiny passage defined by a gap between the mating surfaces of the main body and of the cover.

According to the present invention, the tiny passage is defined by a gap between the mating surfaces of the main body and of the cover and as such forms a tiny passage of water. Therefore, by providing the blind passages at an intermediate position and/or a position near the entrance of the tiny passage, in particular, when the water pressure is high, the blind passage can act as a buffer. By providing these blind passages, the force of the water can be reduced. Thus, even when the water is emitted at an exit of the tiny passage, the force of the water is very small, and the water is prevented from being splashed onto the electric components or the like received in the box main body. As such, the water that does escape through the exit of the tiny passage falls downward, and is discharged through a drain outlet of an undercover assembled under the box main body.

According to the invention claimed in claim 2, there is provided the waterproof box as claimed in claim 1, wherein rotation support points for making the cover rotatable and detachable relative to the box main body are provided on the waterproof structure portions of the main body and of the cover.

According to the present invention having such an aspect, the cover becomes rotatable about the rotation support point. As such, the cover can open or close an opening in the box main body by being rotated. The lock mechanisms in the box main body and the cover for locking the box main body and the cover with each other are only provided at positions opposite to positions on which the rotation support points are provided. Namely, the lock can be released at one point. According to the present invention, the cover can be detached by only one action with a single hand.

According to the invention claimed in claims 3 and 4, there is provided the waterproof box as claimed in claim 1 or 2, wherein an entrance side of the tiny passage is disposed outward from an outer peripheral wall of the box main body, and wherein a second blind passage having a space with a desired size is provided inside of the mating surface of the main body at the entrance side of the tiny passage, and continued to the outer peripheral wall.

According to the present invention having such an aspect, the cleaning water travelling toward the waterproof box hits the peripheral wall of the box main body, then moves upward along the peripheral wall, and enters the second blind passage. The force of the water entering the second blind passage is then reduced. Further, according to the present invention, because to the entrance of the tiny passage is disposed outward from the outer peripheral wall of the box main body, the water is prevented from entering.

According to the invention claimed in claims 5 and 6, there is provided the waterproof box as claimed in claim 1 or 2, wherein a spring including the mating surface of the main body and elastically closing an opening of the blind passage is provided on the mating surface of the main body.

According to the present invention having such an aspect, the opening of the blind passage is elastically blocked by the spring. Thereby, a passage (invasion) of the water is restricted. If the water is pressed against the elastic force of the spring, the force of the water is reduced by entering the blind passage.

According to the invention claimed in claim 7, there is provided the waterproof box as claimed in any one of claims 1 to 6, wherein a press-fit portion for generating a press-fit state is provided on the tiny pass at a position nearer the exit of the tiny passage than the blind passage.

According to the present invention having such an aspect, because the press-fit state is generated by the press-fit portion, the passage (invasion) of the water is restricted.

Effects of the Invention

According to the invention claimed in claim 1, by providing a blind passage in the middle of the tiny passage, an effect to reduce the force of the water moving upward the tiny passage is achieved. Therefore, according to the present invention, even if the water is passed through the exit of the tiny passage, the force of the water is reduced, thereby an effect to prevent the water from splashing onto the components received in the box main body is achieved. Further, according to the present invention, the waterproof performance is improved over the conventional waterproof box.

According to the invention claimed in claim 2, by providing a rotation support point, an effect to attach and detach the cover by one action with a single hand is achieved. Therefore, according to the present invention, an effect to increase the workability more than the conventional waterproof box is achieved. Further, it becomes unnecessary to have a large space for both hands of a worker above the cover because the box may be opened with one action via a single hand, thereby saving space in the vehicle.

According to the invention claimed in claims 3 and 4, by providing a second blind passage, an effect to reduce the force of the water moving upward along the peripheral wall of the box main body is achieved. Therefore, according to the present invention, the waterproof performance is improved.

According to the invention claimed in claims 5 and 6, by providing a spring for elastically closing the opening of the blind passage, an effect to restrict the passage of the water and to further improve the waterproof performance is achieved.

According to the invention claimed in claim 7, by providing a press-fit portion, an effect to restrict the passage of the water and to further improve the waterproof performance is achieved.

DESCRIPTION OF EMBODIMENTS

Figure 1:
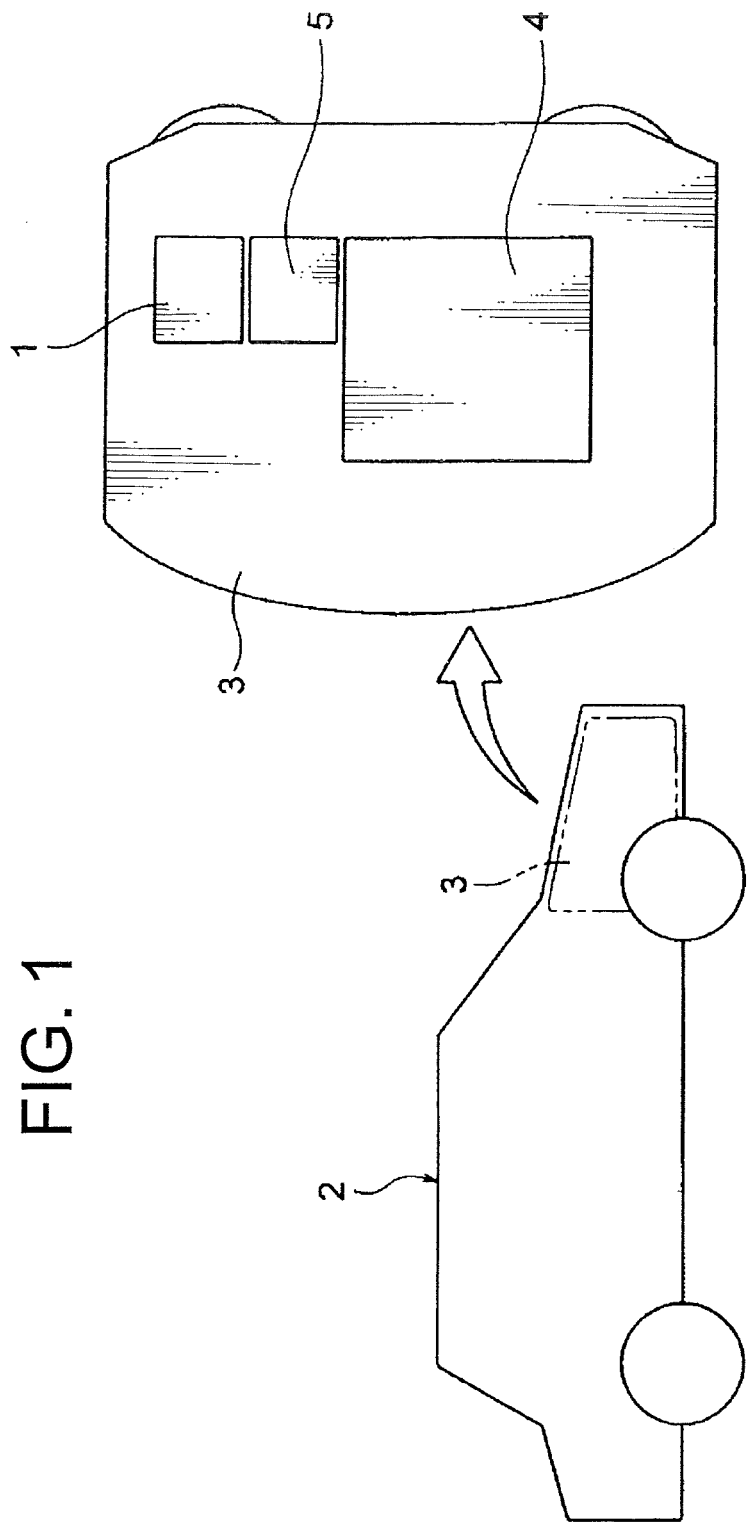
FIG. 1 A schematic view showing an installation example of an electrical junction box including a waterproof box according to the present invention.
Figure 2:
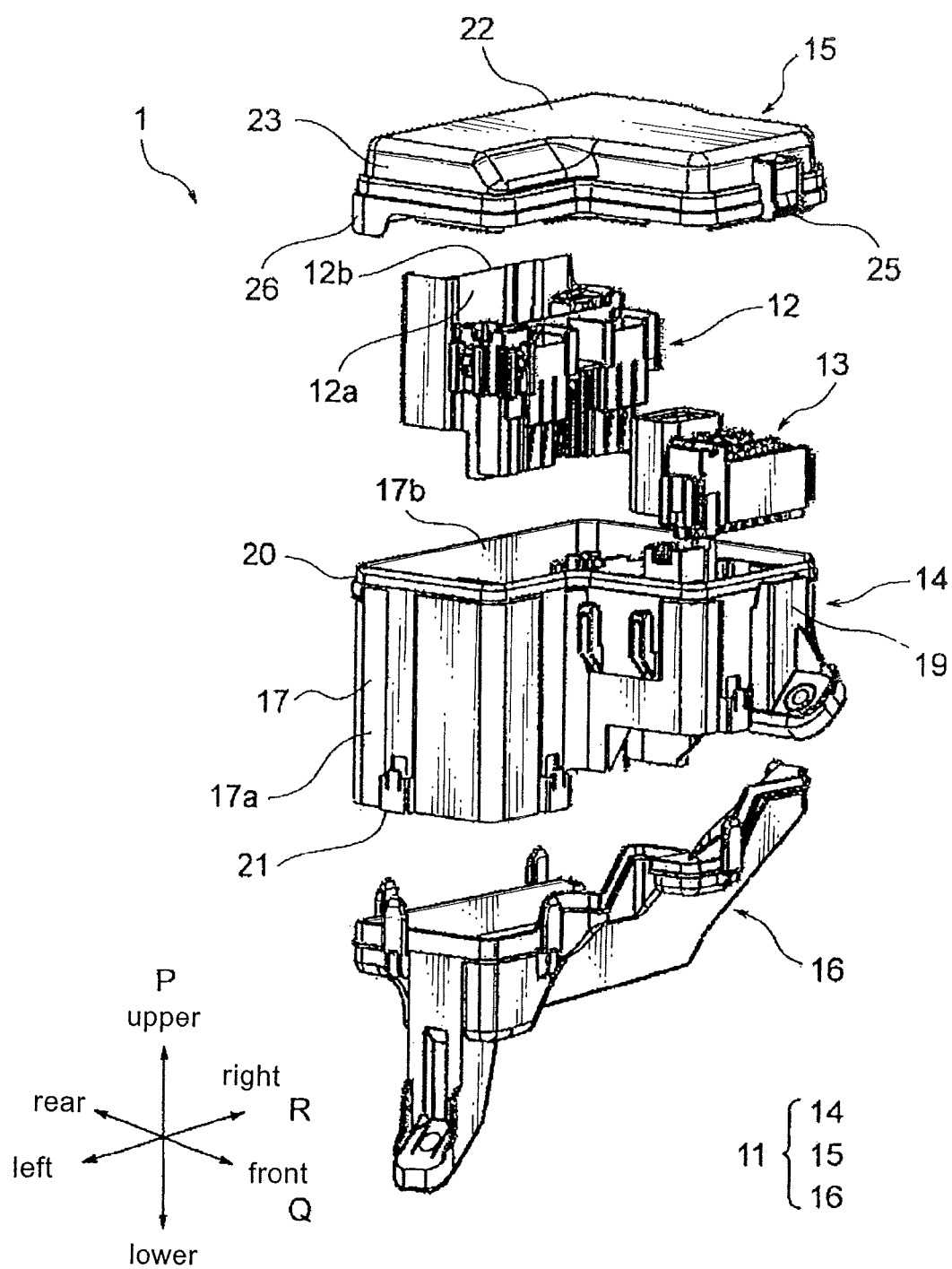
FIG. 2 An exploded perspective view showing the electrical junction box.

Hereinafter, an example of an embodiment will be explained with reference to figures. FIG. 1 is a schematic view showing an installation example of an electrical junction box including a waterproof box according to the present invention. Further, FIG. 2 is an exploded perspective view showing the electrical junction box. Further, FIGS. 3 to 8 are various kinds of figures according to the waterproof box of the present invention.

In FIG. 1, reference sign 1 denotes an electrical junction box (on vehicle electric components receiving device such as RIB: relay box, JIB: junction box, ECU or the like). An electrical junction box 1 is illustrated as a relay box, but not limited to, and mounted within an engine compartment 3 of a vehicle 2. In the engine room 3, a battery 5 is mounted next to an engine 4. Further, the electrical junction box 1 is mounted next to this. Because the electrical junction box 1 is mounted in the engine compartment 3, when the vehicle 2 operating in the rain, or when the engine compartment 3 is being washed under high pressure, it is necessary to prevent water from being splashed onto electric components or the like (components that are damaged by water) received inside the electrical junction box 1.

The electrical junction box 1 explained below includes a waterproof box according to the present invention, and water is prevented from being splashed onto the electric components or the like received inside the electrical junction box 1 even during high pressure cleaning (e.g., 8 MPa to 12 Mpa).

In FIG. 2, the electrical junction box 1 includes: a synthetic-resin-made waterproof box 11; and functional components 12, 13 received in the waterproof box 11. A not-shown wiring harness having, for example, aluminum electric wire is guided into the waterproof box 11. The functional components 12, 13 include components such as relays. (Illustration of the relay or the like is omitted. A cavity is mainly shown in FIG. 2.) A later-described inner wall 12a is provided on the cavity of the functional component 12.

The waterproof box 11 includes: a box main body 14 receiving the functional components 12, 13; an upper cover 15 (corresponding to a cover described in the claims) covering an upper opening of the box main body 14; and a lower cover 16 fitted into a lower portion of the box main body 14.

The present invention has some features in the box main body 14 and the upper cover 15. One of these features is to have a waterproof structure having high waterproof performance despite its packing-less configuration. Further, another feature of the present invention is that the upper cover 15 is rotatable with respect to the box main body 14, and detachable by one action with a single hand. Hereinafter, the box main body 14 and the upper cover 15 will be explained including these features.

The box main body 14 has a peripheral wall 17. The peripheral wall 17 is formed in a frame shape. That is, the peripheral wall 17 is formed in a shape shown in FIG. 2 by continuing a plurality of walls. Here, an arrow P is defined as an upper-lower direction, an arrow Q is defined as a front-rear direction, and an arrow R is defined as a left-right direction (here, they are defined so as not to match the front-rear direction and the left-right direction of the engine compartment 3). A rotation support point 18 (see FIG. 3) for making the upper cover 15 rotatable and detachable is provided on an outer wall at a rear side of the peripheral wall 17. Further, a main-body lock 19 for making the upper cover 15 in a locked state is provided on an outer wall at a front side of the peripheral wall 17.

In the box main body 14, the upper cover 15 is rotatable about the rotation support point 18, and the main-body lock 19 locks the upper cover 15 in a locked state. Further, the upper cover 15 is easily detached by releasing the locked state and at the same time by rotating the upper cover 15 while lifting.

A waterproof structure portion at the main body side 20 for waterproofing is provided around a periphery of an upper end of the peripheral wall 17. Further, a fitting portion 21 for fitting the lower cover 16 is provided around a periphery of a lower end of the peripheral wall 17. Incidentally, a commonly-known structure is used in the fitting portion 21, and an explanation here is omitted.

The upper cover 15 is formed so as to match with a shape of the box main body 14, and includes: a ceiling wall 22 as a top portion of the waterproof box 11; and a cover peripheral wall 23 extended downward from a peripheral edge of the ceiling wall 22. A rear wall of the cover peripheral wall 23 is provided with a rotation support point 24 (see FIG. 3) as a rotation center of the upper cover 15 together with the rotation support point 18 (see FIG. 3) of the box main body 14. Further, a cover lock 25 for hooking on the main-body lock 19 of the box main body 14 and being locked is provided on an outer wall at a front side of the cover peripheral wall 23. A waterproof structure portion at the cover side 26 for waterproofing is provided around a periphery of a lower end of the cover peripheral wall 23.

A commonly-known structure is used for the lower cover 16, and an explanation in detail is therefore omitted.

Figure 3:
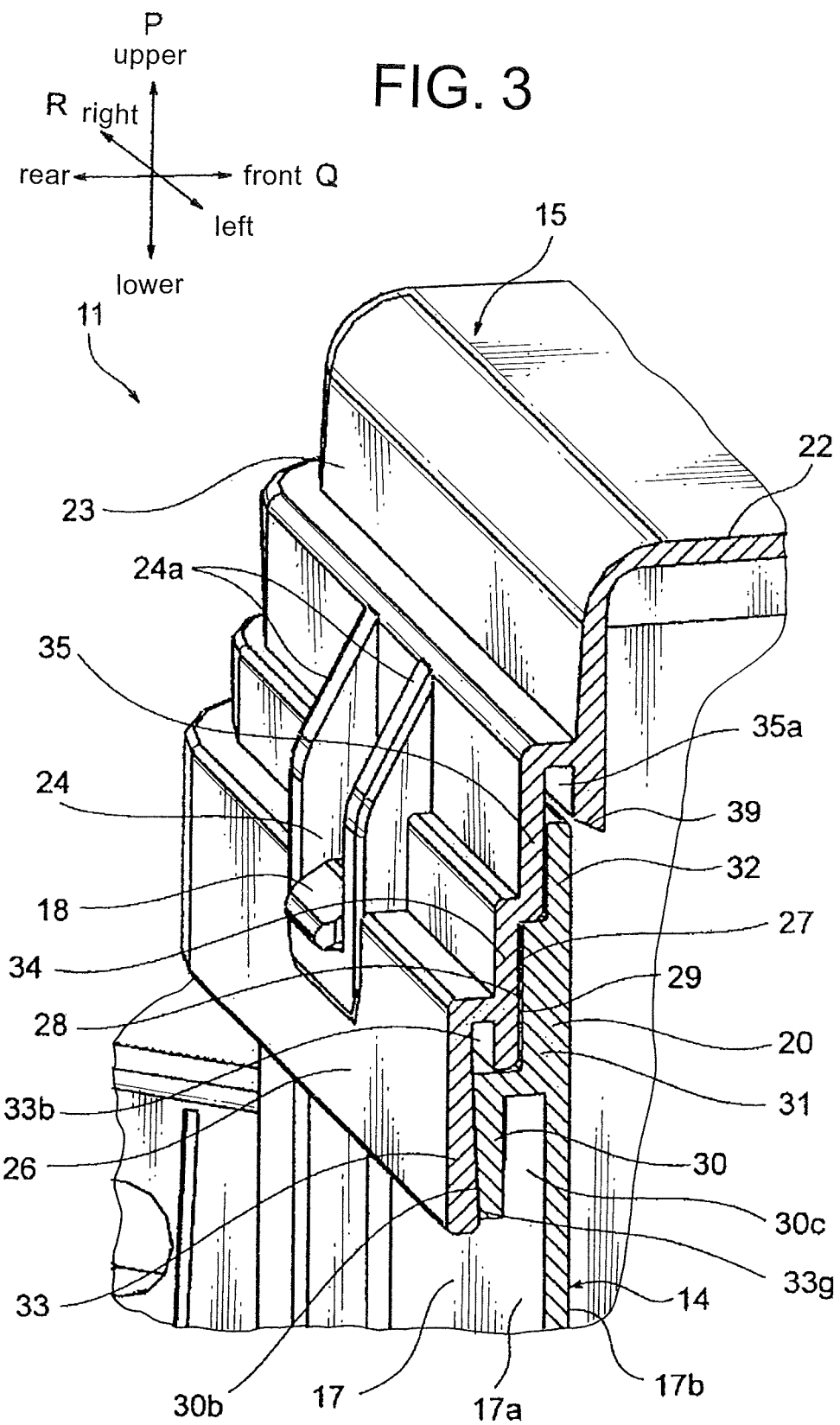
FIG. 3 A partially sectional perspective view showing waterproof structure portions at a main body side and at a cover side.
Figure 4:
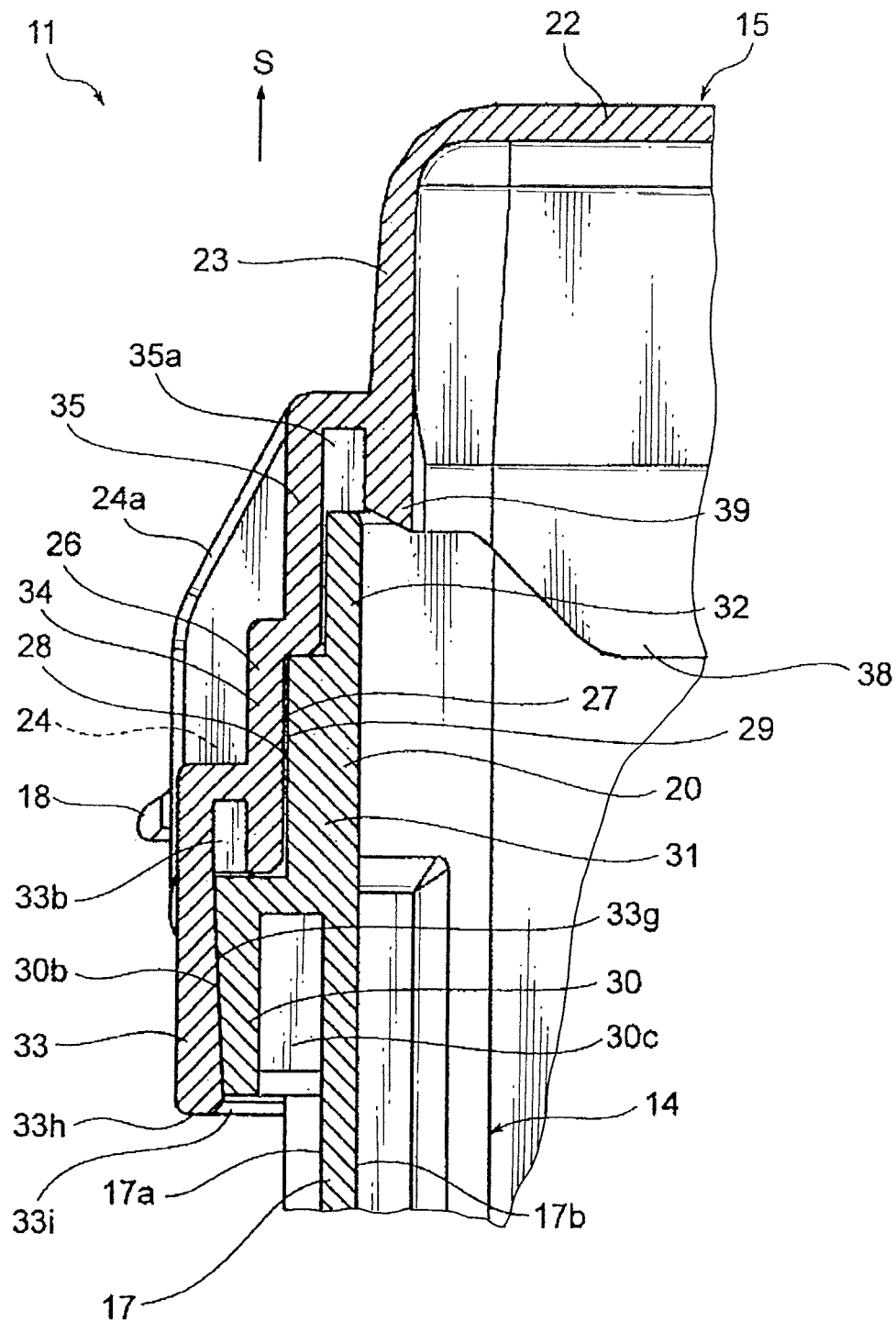
FIG. 4 A sectional view showing the waterproof structure portions at the main body side and at the cover side.

The waterproof structure portions at the main body side 20 and at the cover side 26 will be explained in detail with reference to FIGS. 3 to 8. FIGS. 3 and 4 show the waterproof structure at a wall portion having the rotation support points 18, 24 as a representative example of the whole peripheral wall.

As shown in FIGS. 3 and 4, when the upper cover 15 is rotated with respect to the box main body 14, and then locked, the waterproof structure portions at the main body side 20 and at the cover side 26 are overlapped with each other.

Incidentally, for rotating the upper cover 15, structurally, it is necessary to consider a rotation trace, however, it is impossible to overlap them without a gap across the whole periphery. Therefore, a tiny passage 27 is formed between facing walls (later-described mating walls) of the waterproof structure portions at the main body side 20 and at the cover side 26 (FIG. 5B shows schematically the tiny passage 27 indicating a water invasion direction). Incidentally, it is an object of the waterproof structure of the waterproof box 11 to prevent the water invasion within a range of the tiny passage 27, and to reduce dramatically the force of the invading water.

A mating wall at the main body side 28 is formed on the waterproof structure portion at the main body side 20. A mating wall at the cover side 29 is formed on the waterproof structure portion at the cover side 26. The mating wall at the main body side 28 and the mating wall at the cover side 29 face each other when the main body side 20 and at the cover side 26 are overlapped with each other. Walls as components of the mating wall at the main body side 28 and the mating wall at the cover side 29 are described below.

As shown in FIGS. 3 to 8, the waterproof structure portion at the main body side 20 is provided on an upper end of the peripheral wall 17 for waterproofing as described above, and includes: a first waterproof portion 30 as an entrance side of the tiny passage 27; a second waterproof portion 31 as an intermediate portion of the tiny passage 27; and a third waterproof portion 32 as an exit side of the tiny passage 27 (in the tiny passage 27, a first water invasion portion from an outside is defined as an entrance). Below is explained sequentially from the third waterproof portion 32.

The third waterproof portion 32 is disposed at an upper end of the peripheral wall 17. The third waterproof portion 32 is formed with the same thickness as the peripheral wall 17 (an outer wall 17a and an inner wall 17b defining the thickness of the peripheral wall 17 are formed along the upper-lower direction). The third waterproof portion 32 has an upper wall 32a conforming to an upper end wall of the peripheral wall 17. This upper wall 32a is a component of the mating wall at the main body side 28. Further, an outer wall 32b continued to the upper wall 32a and perpendicular to the upper wall 32a is also a component of the mating wall at the main body side 28. The outer wall 32b is formed parallel to the inner wall 17b of the peripheral wall 17. The upper wall 32a has a small chamfered portion 32c at a portion continued to the inner wall 17b.

The second waterproof portion 31 is arranged under the third waterproof portion, 32. The second waterproof portion 31 has a wall which is substantially twice as thick as the third waterproof portion 32 (substantially twice as thick is one example). The second waterproof portion 31 is projected more outward than the third waterproof portion 32 because the second waterproof portion 31 is thicker than the third waterproof portion 32. An upper wall 31a of the second waterproof portion 31 is continued to the outer wall 32b of the third waterproof portion 32, and perpendicular to the outer wall 32b. Further, the upper wall 31a is formed parallel to the upper wall 32a of the third waterproof portion 32. The upper wall 31a is a component of the mating wall at the main body side 28. An outer wall 31b which is continued to and perpendicular to the upper wall 31a is formed longer than the outer wall 32b of the third waterproof portion 32. The outer wall 31b is formed parallel to the inner wall 17b of the peripheral wall 17. The outer wall 31b is a component of the mating wall at the main body side 28. Additionally, a projection-shaped rotation support point 18 projected outward from the outer wall 31b is provided on a predetermined position of the outer wall 31b.

The first waterproof portion 30 is arranged under the second waterproof portion 31. The first waterproof portion 30 is projected further outward than the second waterproof portion 31. An upper wall 30a of the first waterproof portion 30 is continued toward and is perpendicular to the outer wall 31b of the second waterproof portion 31. Further, the upper wall 30a is formed parallel to the upper wall 31a of the second waterproof portion 31. The upper wall 30a is formed longer than the upper wall 31a of the second waterproof portion 31. The upper wall 30a is a component of the mating wall at the main body side 28. An outer wall 30b continued to the upper wall 30a is not parallel to the inner wall 17b of the peripheral wall 17, but sloped. Specifically, the outer wall 30b is a tapered wall so as to gradually decrease a distance to the inner wall 17b as the outer wall 30b extends downward. A blind passage 30c (corresponding to a second blind passage in claims) continued to the outer wall 17a of the peripheral wall 17 is formed in between the tapered outer wall 30b and the outer wall 17a.

The blind passage 30c is formed so that a lower side is open and an upper side is dead end, and has a desired sized space. The blind passage 30c includes: an inner wall 30d conforming to the outer wall 17a of the peripheral wall 17; an outer wall 30e parallel to the inner wall 30d; and a backside wall 30f parallel to the upper wall 30a in an inside of the blind passage 30c. The blind passage 30c has a larger space than later-described other blind passages 35a, 33b (a larger amount of cleaning water enters the blind passage 30c).

When viewing from the upper wall 32a of the third waterproof portion 32 to the tapered outer wall 30b of the first waterproof portion 30 as components of the mating wall at the main body side 28 from a view of a section of the waterproof structure portion at the main body side 20, the mating wall at the main body side 28 is formed in a terraced shape, namely, in a maze shape. Namely, the mating wall at the main body side 28 is formed in a shape so as to prevent water from entering.

In contrast, the waterproof structure portion at the cover side 26 is provided on a lower end of the cover peripheral wall 23 to waterproof as described above, and includes: a first waterproof portion 33 as an entrance side of the tiny passage 27; a second waterproof portion 34 as a middle of the tiny passage 27; and a third waterproof portion 35 as an exit side of the tiny passage 27, and is formed in substantially a skirt shape opening outward. The first waterproof portion 33 is arranged corresponding to the first waterproof portion 30 of the waterproof structure portion at the main body side 20. Further, the second waterproof portion 34 is arranged corresponding to the second waterproof portion 31 of the waterproof structure portion at the main body side 20. Further, the third waterproof portion 35 is arranged corresponding to the third waterproof portion 32 of the waterproof structure portion at the main body side 20. We will explain sequentially from the third waterproof portion 35.

The third waterproof portion 35 includes a blind passage 35a opened at a wall facing the upper wall 32a of the third waterproof portion 32 of the waterproof structure portion at the main body side 20 (a wall as a component of the mating wall at the cover side 29). The blind passage 35a is formed so that a lower side is open and an upper side is a dead end, and has a desired sized space. The blind passage 35a includes: an inner wall 35b; an outer wall 35c parallel to the inner wall 35b; and a backside wall 35d connecting the inner wall 35b with the outer wall 35c. The inner wall 35b is arranged just over the inner wall 17b of the peripheral wall 17 of the box main body 14. The blind passage 35a is formed so that the inner wall 35b is arranged at a lower end of the cover peripheral wall 23.

Regarding an arrangement of the blind passage 35a and an exit position of the tiny passage 27, when an intersection point between an opening of the blind passage 35a and the inner wall 35b is set as an exit standard 36, and an intersection point between the inner wall 17b of the peripheral wall 17 and the upper wall 32a of the third waterproof portion 32 is set as an exit standard 37. These exit standards 36, 37 are arranged in the same plane. Namely, the exit standards 36, 37 are set so as to narrow the exit of the tiny passage 27 to as small as possible to prevent water from running out via the exit. (As the exit standard 36 is positioned more inside of the box main body 14 than the exit standard 37, the width of the exit becomes wider, and water runs out more easily via the tiny passage 27.)

The third waterproof portion 35 includes a wall-shaped portion 35e continued to the blind passage 35a and extended downward and straight. This wall-shaped portion 35e includes an inner wall 35f facing the outer wall 32b of the third waterproof portion 32 of the waterproof structure portion at the main body side 20. The inner wall 35f is a component of the mating wall at the cover side 29. The inner wall 35f includes a small chamfered portion 35g at a portion continued to the second waterproof portion 34. (The chamfered portion 35g is also a component of the mating wall at the cover side 29.)

The second waterproof portion 34 is arranged under the third waterproof portion 35. The second waterproof portion 34 is a wall-shaped portion having a lower wall 34a facing the upper wall 31a of the second waterproof portion 31 of the waterproof structure portion at the main body side 20, and an inner wall 34b facing the outer wall 31b. The lower wall 34a is continued to the chamfered portion 35g of the third waterproof portion 35, and the inner wall 34b is continued to the lower wall 34a at this opposite side. The inner wall 34b is formed perpendicular to the lower wall 34a, and extends straight downward. This inner wall 34b includes a small chamfered portion 34c at a portion continued to the first waterproof portion 33. The lower wall 34a, the inner wall 34b, and the chamfered portion 34c are components of the mating wall at the cover side 29.

The first waterproof portion 33 is arranged under the second waterproof portion 34. The first waterproof portion 33 includes a lower wall 33a facing the upper wall 30a of the first waterproof portion 30 of the waterproof structure portion at the main body side 20. The lower wall 33a is provided with a blind passage 33b opening at this position. The blind passage 33b is formed so that a lower side is open and an upper side is a dead end, and has a desired sized space. The blind passage 33b includes: an inner wall 33b an outer wall 33d parallel to the inner wall 33c; and a backside wall 33e connecting the inner wall 33c with the outer wall 33d. The inner wall 33c is formed perpendicular to the upper wall 30a of the first waterproof portion 30.

The first waterproof portion 33 includes a wall-shaped portion 33f continued to the blind passage 33b and extended straight downward. This wall-shaped portion 33f includes a tapered inner wall 33g. The inner wall 33g is formed so as to face the tapered outer wall 30b of the first waterproof portion 30 of the waterproof structure portion at the main body side 20, and so as to abut on and engage with the outer wall 30b when the upper cover 15 is going to be moved upward. The inner wall 33g is a component of the mating wall at the cover side 29.

The first waterproof portion 33 includes: a lower wall 33h as the most bottom end of the upper cover 15; and a chamfered portion 33i continued to the lower wall 33h and the inner wall 33g other than the above described walls.

The rotation support point 24 provided on the waterproof structure portion at the cover side 26 includes: a through-hole (not shown) allowing the projection-shaped rotation support point 18 of the waterproof structure portion at the main body side 20 to be inserted therein; and a pair of protection walls 24a disposed at both sides of the through-hole. The pair of protection walls 24a are formed in a rib shape, and extended in the upper-lower direction.

Returning to FIG. 2, the cavity of the functional component 12 is provided with the inner wall 12a. This inner wall 12a is arranged with a predetermined gap from the inner wall 17b of the peripheral wall 17 of the box main body 14. A tip 12b of the inner wall 12a is projected so as to be positioned at the base end side of the cover peripheral wall 23. The tip 12b of the inner wall 12a is projected so as to be positioned higher than the exit of the tiny passage 27. The inner wall 12a is formed as a component in order to prevent water from being splashed onto the electric component or the like (components disliking water) other than the waterproof structure portion at the main body side 20 and the waterproof structure portion at the cover side 26.

The waterproof structure portion at the main body side 20 and the waterproof structure portion at the cover side 26 are enough to prevent water from being splashed onto the electric component or the like (components disliking water). By forming the inner wall 12a, the effectiveness is improved.

As shown in FIG. 4, the upper cover 15 includes the inner wall 38 extended so as to face the inner wall 17b of the peripheral wall 17 of the box main body 14. The inner wall 38 is formed so as to continue to a lower end of the cover peripheral wall 23. The inner wall 38 is provided on other than the wall on which the rotation support point 24 as a rotation center of the upper cover 15 exists. This reason is because the upper cover 15 is rotatable, in consideration of the rotation track, the inner wall 38 is provided on other than the above wall. The wall on which the rotation support point 24 exists is provided with the tapered portion 39 so that a tip of the tapered portion 39 is lower than the exit of the tiny passage 27. The tapered portion 39 slightly works as an inner wall.

Figure 5:
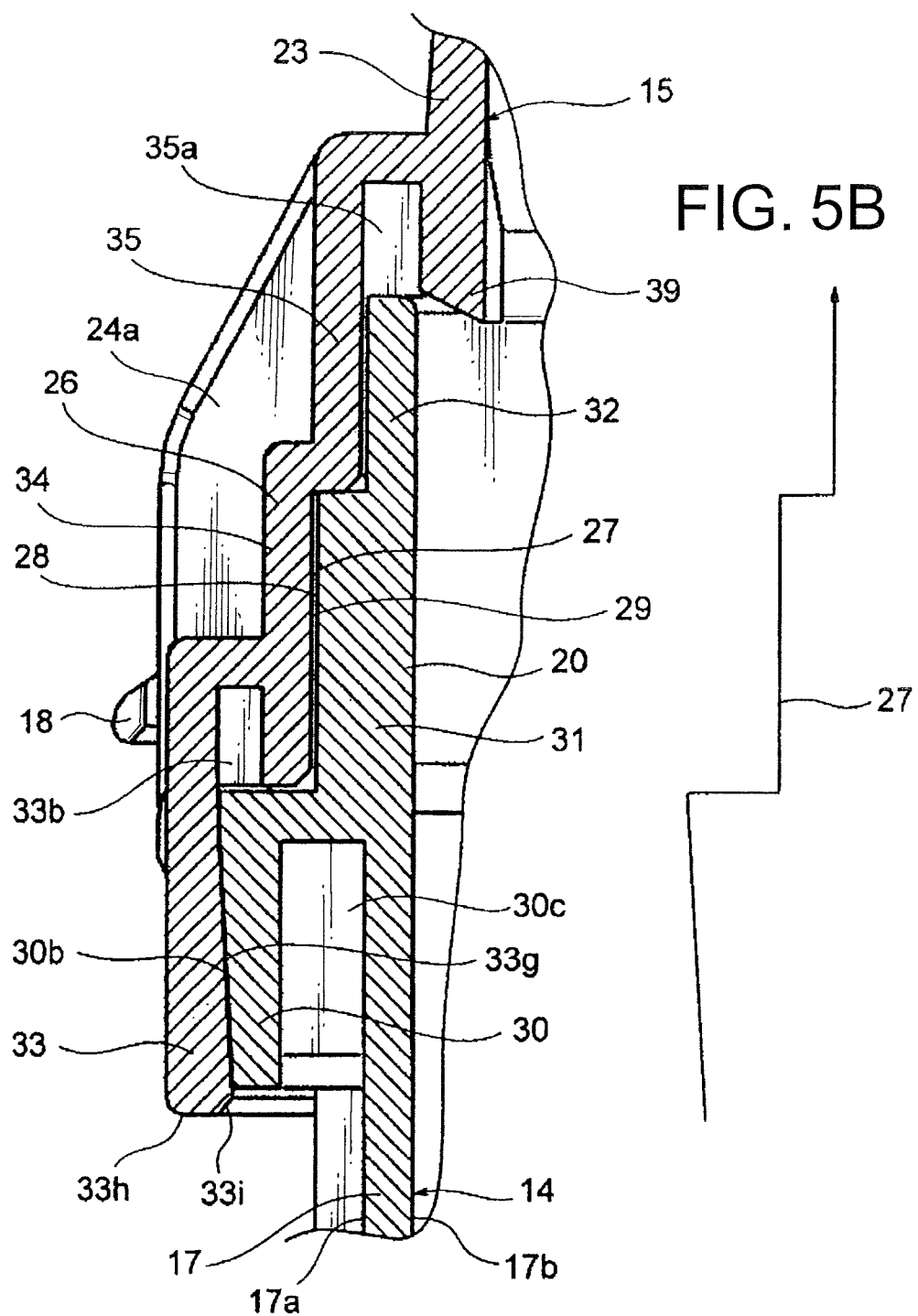
FIG. 5A A sectional view showing the waterproof structure portions at the main body side and at the cover side.
FIG. 5B A schematic view showing a tiny passage.
Figure 6:
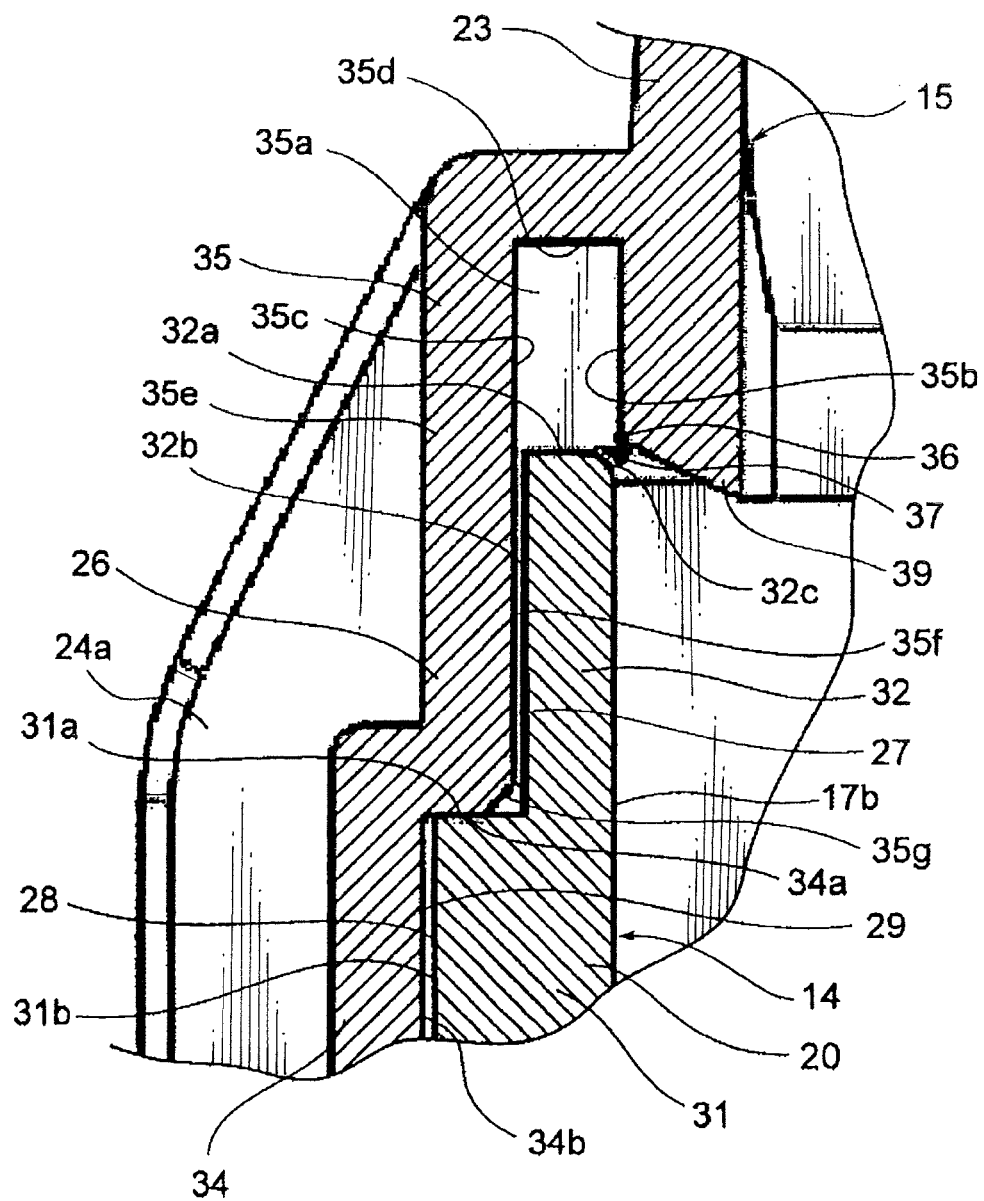
FIG. 6 An enlarged sectional view showing a third waterproof portion.
Figure 7:
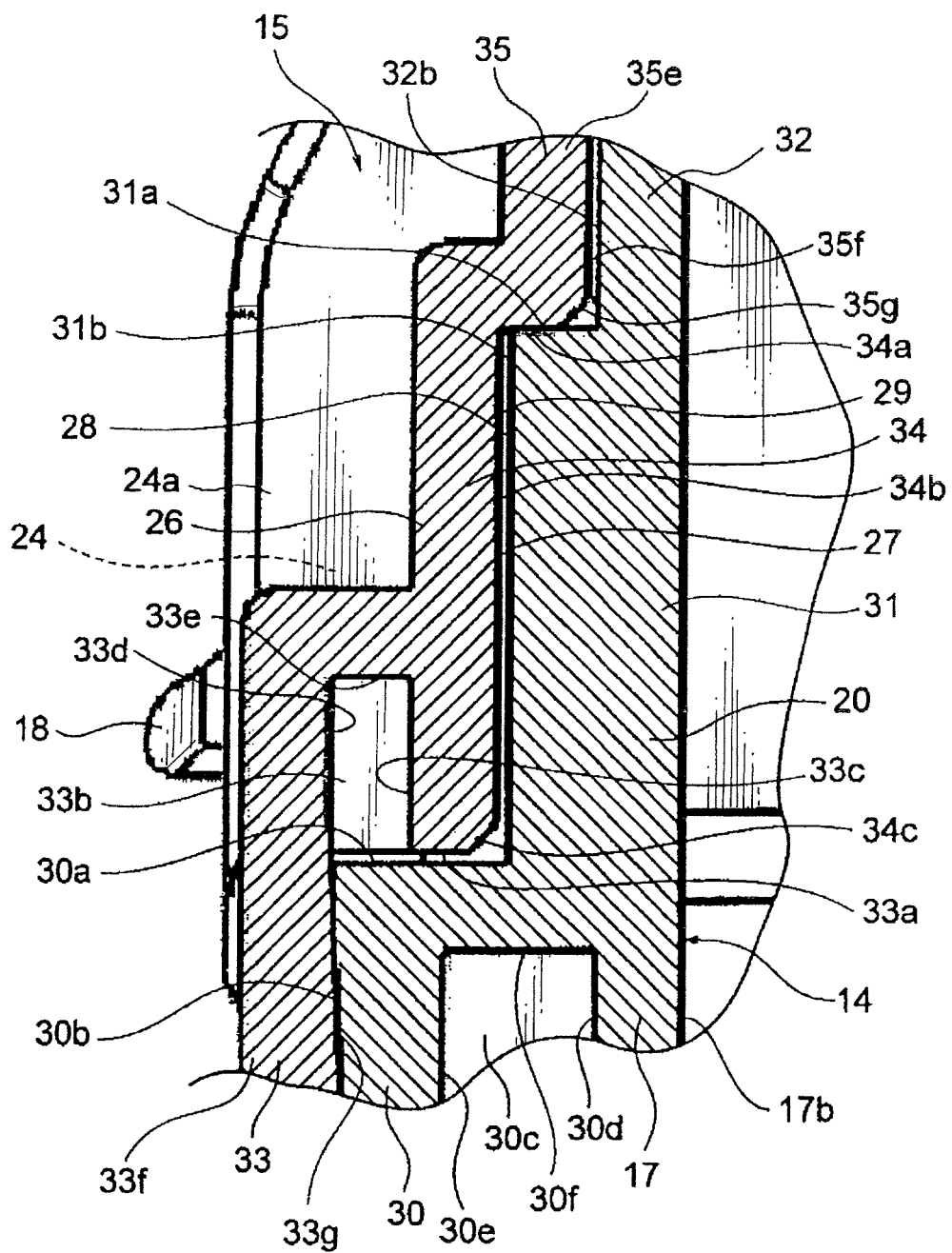
FIG. 7 An enlarged sectional view showing a second waterproof portion.
Figure 8:
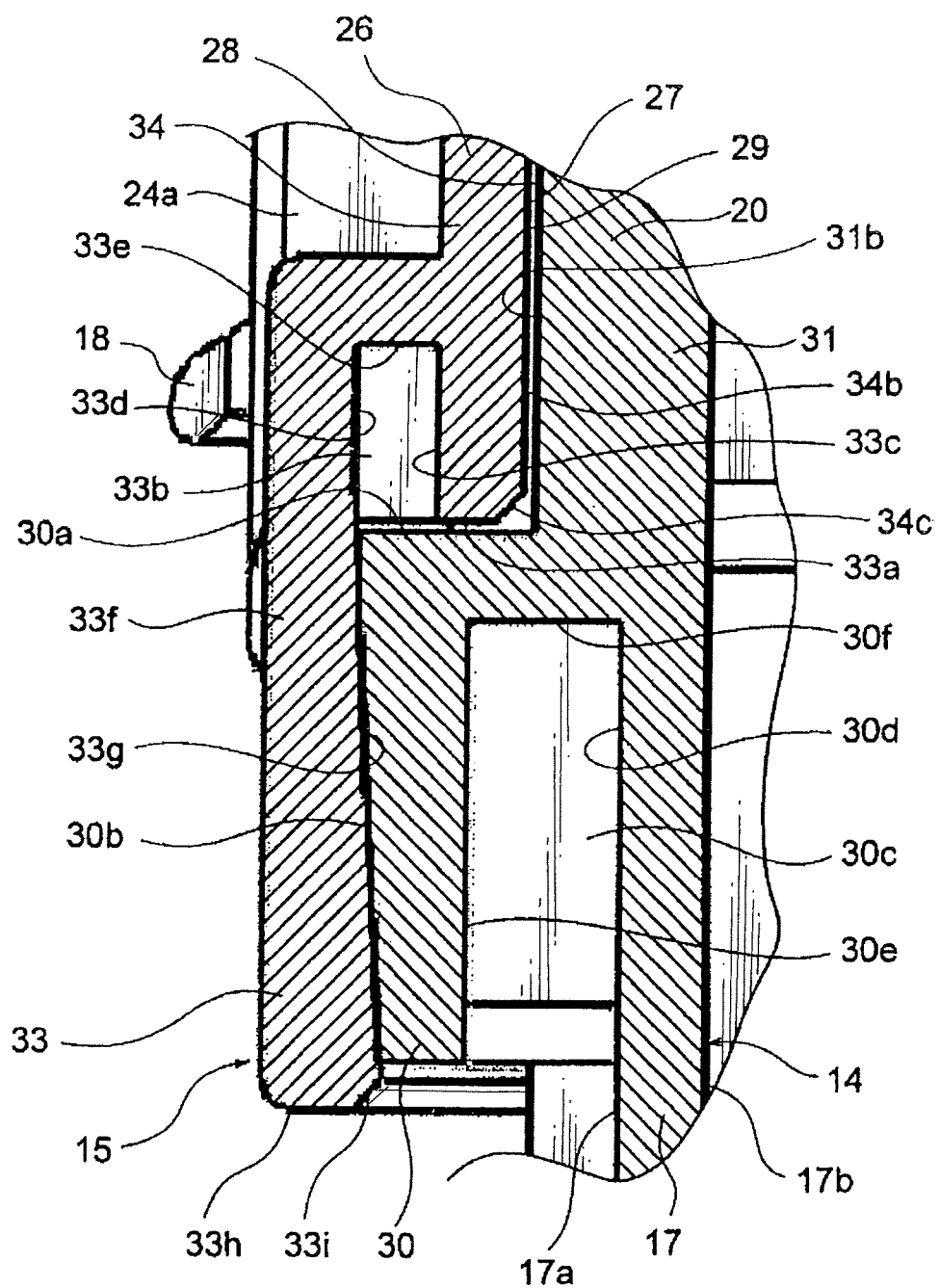
FIG. 8 An enlarged sectional view showing a first waterproof portion.

In the above configuration and the above structure, while the upper cover 15 is held by a single hand, when the rotation support point 24 of the upper cover 15 is inserted into the rotation support point 18 of the box main body 14, and the upper cover 15 is rotated about the rotation support point 18 and the rotation support point 24, the cover lock 25 of the upper cover 15 is caught by the main-body lock 19 of the box main body 14, and locked (a locked state is generated). When the upper opening of the box main body 14 is covered by the upper cover 15, and the waterproof structure portion at the main body side 20 is overlapped with the waterproof structure portion at the cover side 26, a waterproof structure is completed as shown in FIGS. 4 and 5. When the waterproof structure portion at the main body side 20 and the waterproof structure portion at the cover side 26 are overlapped with each other, the mating wall at the main body side 28 and the mating wall at the cover side 29 face each other.

When the high pressure cleaning is done, the water traveling toward the waterproof box 11 hits (the outer wall 17a of) the peripheral wall 17 of the box main body 14, and then the water moves upward along the peripheral wall 17. The cleaning water moving upward along the peripheral wall 17 enters the blind passage 30c of the waterproof structure portion at the main body side 20, thereby the force of the water is reduced. As such, the blind passage 30c works as a buffer, and the water of which force is reduced causing the water to exit without coming in contact with the electrical components therein.

Because an entrance of the tiny passage 27 is disposed away from the outer wall 17a of the peripheral wall 17 of the box main body 14, and because the force of most of the water is reduced, the amount of the water hitting the entrance of the tiny passage 27 is also reduced, and the water is prevented from entering (e.g., water is prevented from entering unless the water hits the entrance of the tiny passage 27 pinpoint hitting).

When the cleaning water hits the lower wall 33*h* of the first waterproof portion 33 of the upper cover 15 (e.g., the lower wall 33*h* as the lowest end of the upper cover 15), and the upper cover 15 is moved in an arrow S direction, namely, the upper cover 15 is blown up, the tapered outer wall 30*b* and the tapered inner wall 33*g* of the first waterproof portions 30, 33 abut on and are engaged with each other, and the entrance of the tiny passage 27 is blocked. Thereby, the water is still prevented from entering the waterproof box.

If the water enters prior to the tapered outer wall 30*b* and the tapered inner wall 33*g* are engaged with each other, because a travelling direction of the water is an extending direction of the outer wall 30*b* and the inner wall 33*g*, the water enters the blind passage 33*b*, and the force of the water is reduced.

Further, if the water enters ahead of the blind passage 33*b*, because the tiny passage 27 is formed in a maze shape having a plurality of steps (corners), the water is prevented from entering (passing) due to the maze shape.

Further, if the water enters between the outer wall 32*b* and the inner wall 35*f* of the third waterproof portions 32, 35, because the travelling direction of the water is an extending direction of the outer wall 32*b* and the inner wall 35*f*, the water enters the blind passage 35*a*, and the force of the water is reduced. The blind passage 35*a* works as a buffer, and the water of which force is reduced exits the waterproof box without coming in contact with the electrical components.

Because the exit of the tiny passage 27 is formed as small as possible as described above, the water entering the blind passage 35*a* and of which force is reduced is hard to exit. If the water exits the exit of the tiny passage 27, this water falls down along the inner wall 17*b* of the peripheral wall 17, and is drained off from a not-shown drain outlet of the lower cover 16.

Figure 9:
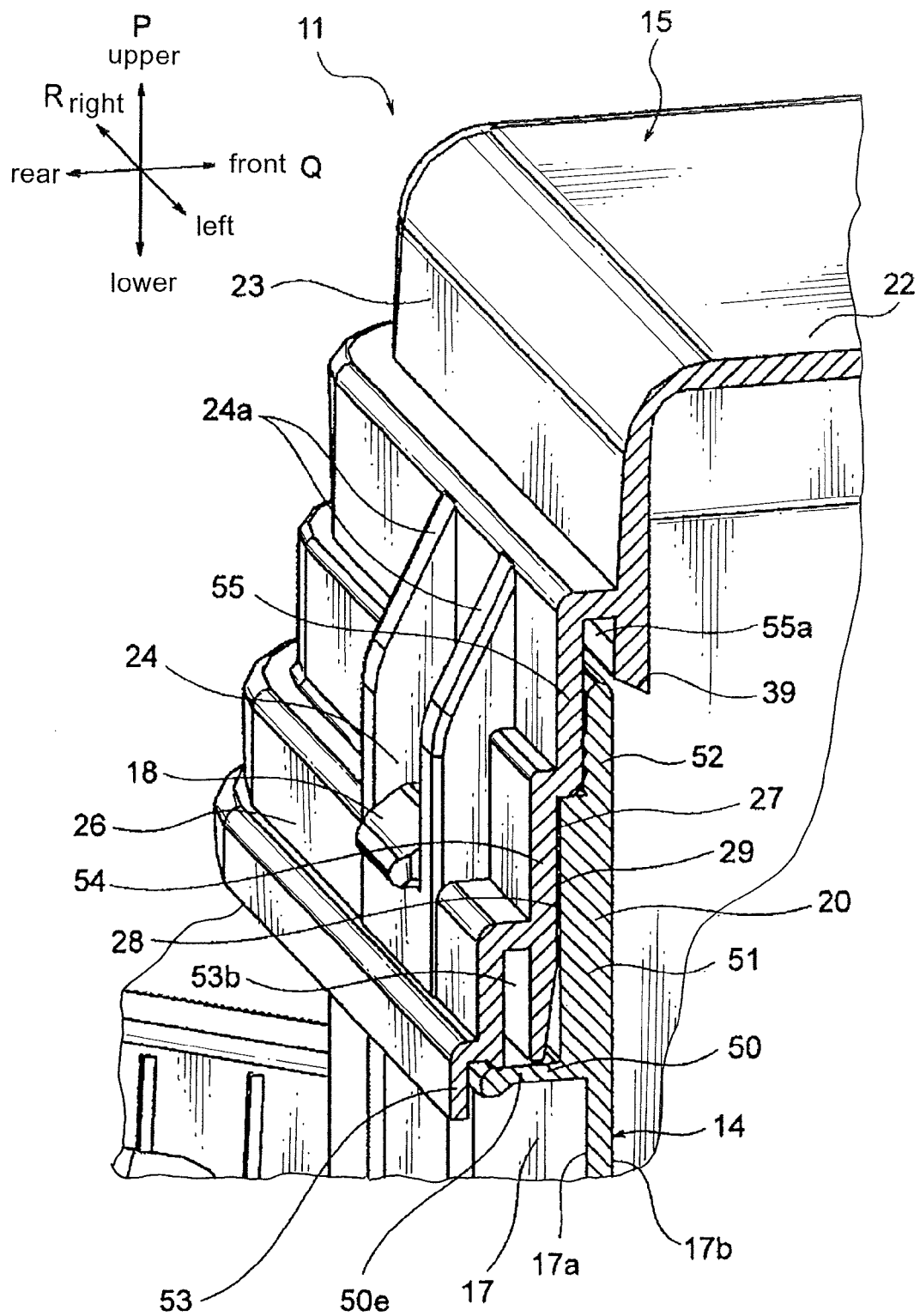
FIG. 9 A partially sectional perspective view showing another embodiment of the waterproof structure portions at the main body side and at the cover side.
Figure 10:
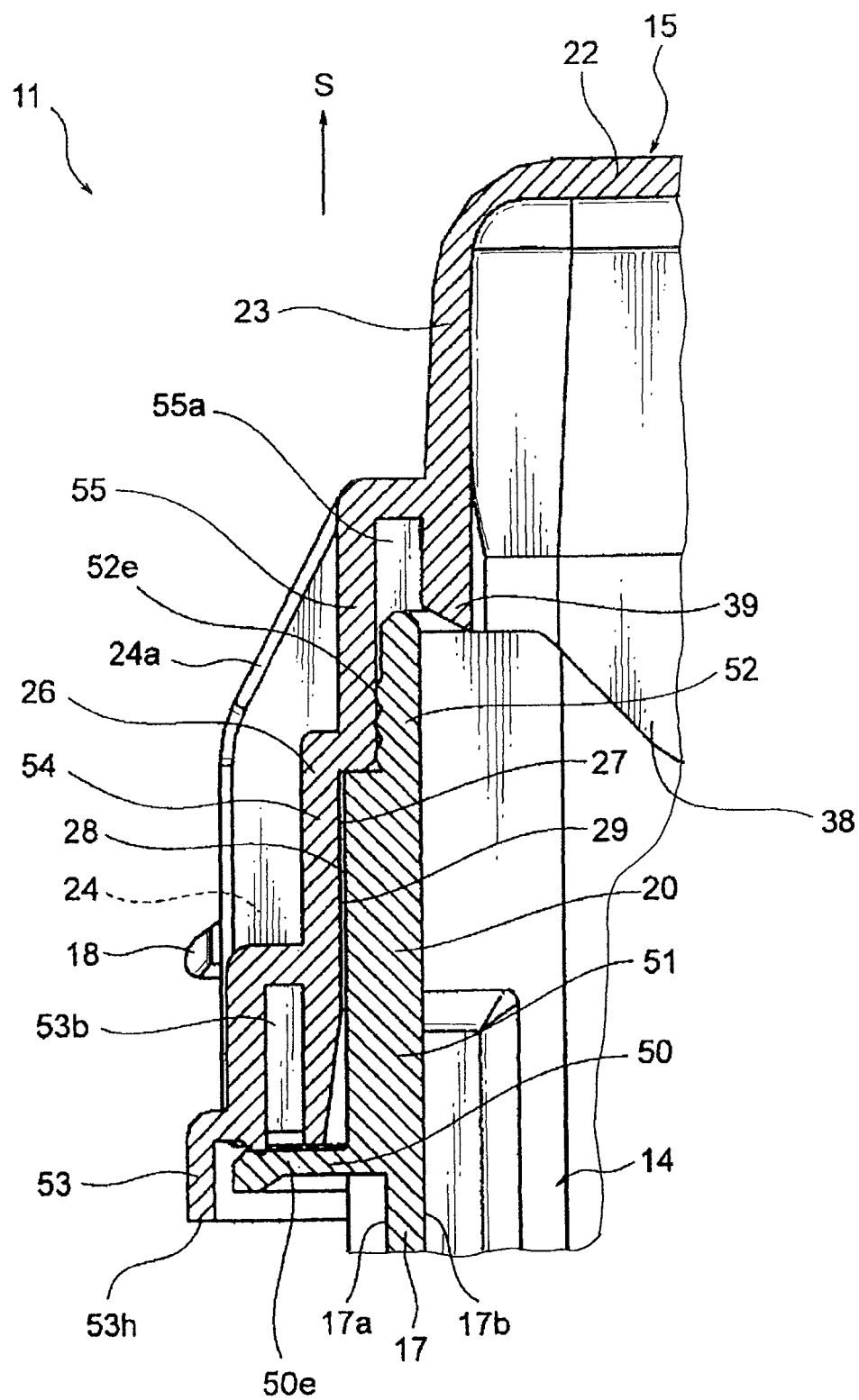
FIG. 10 A sectional view showing another embodiment of the waterproof structure portions at the main body side and at the cover side.
Figure 11:
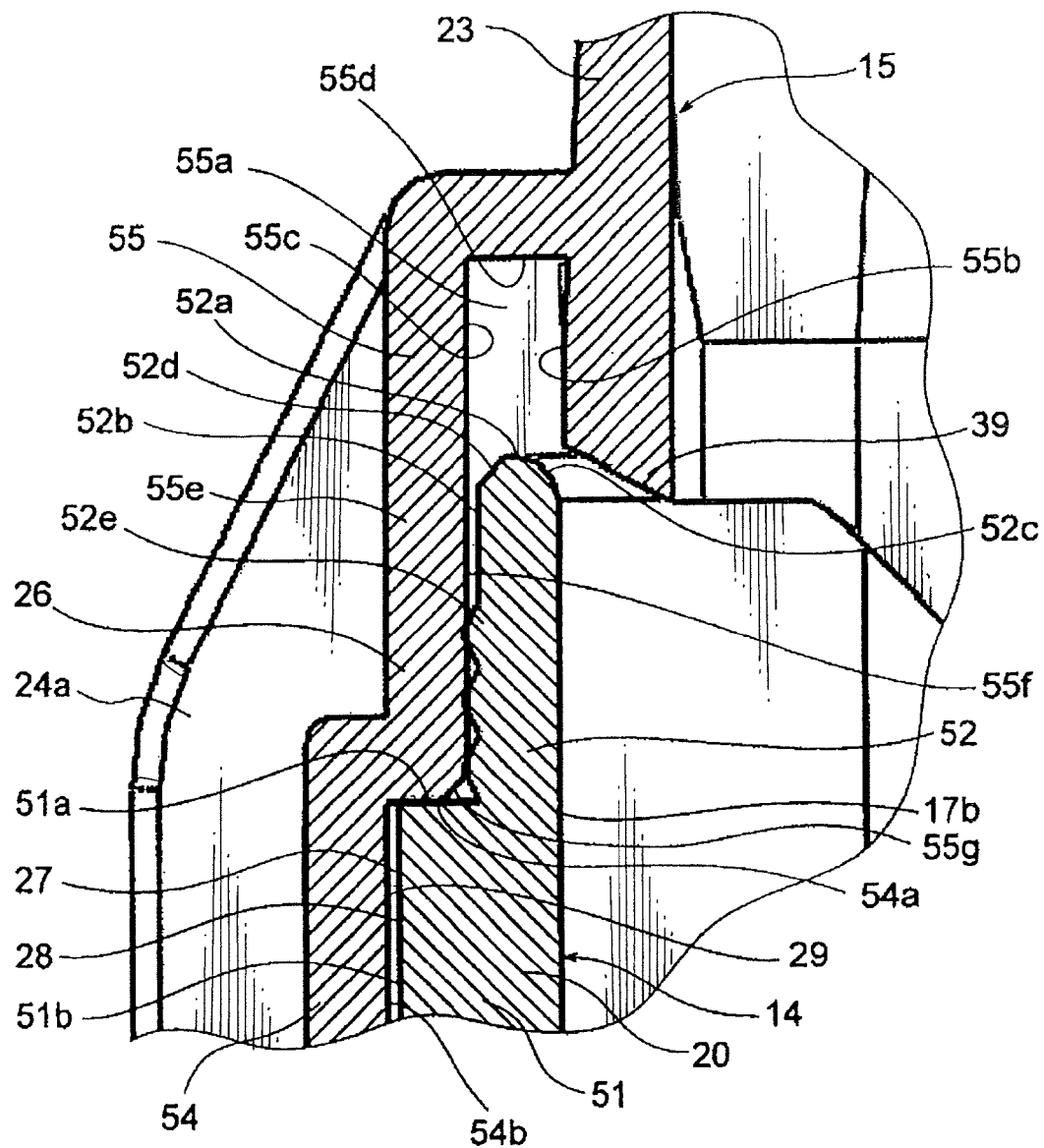
FIG. 11 An enlarged sectional view showing the third and second waterproof portions of FIG. 10.
Figure 12:
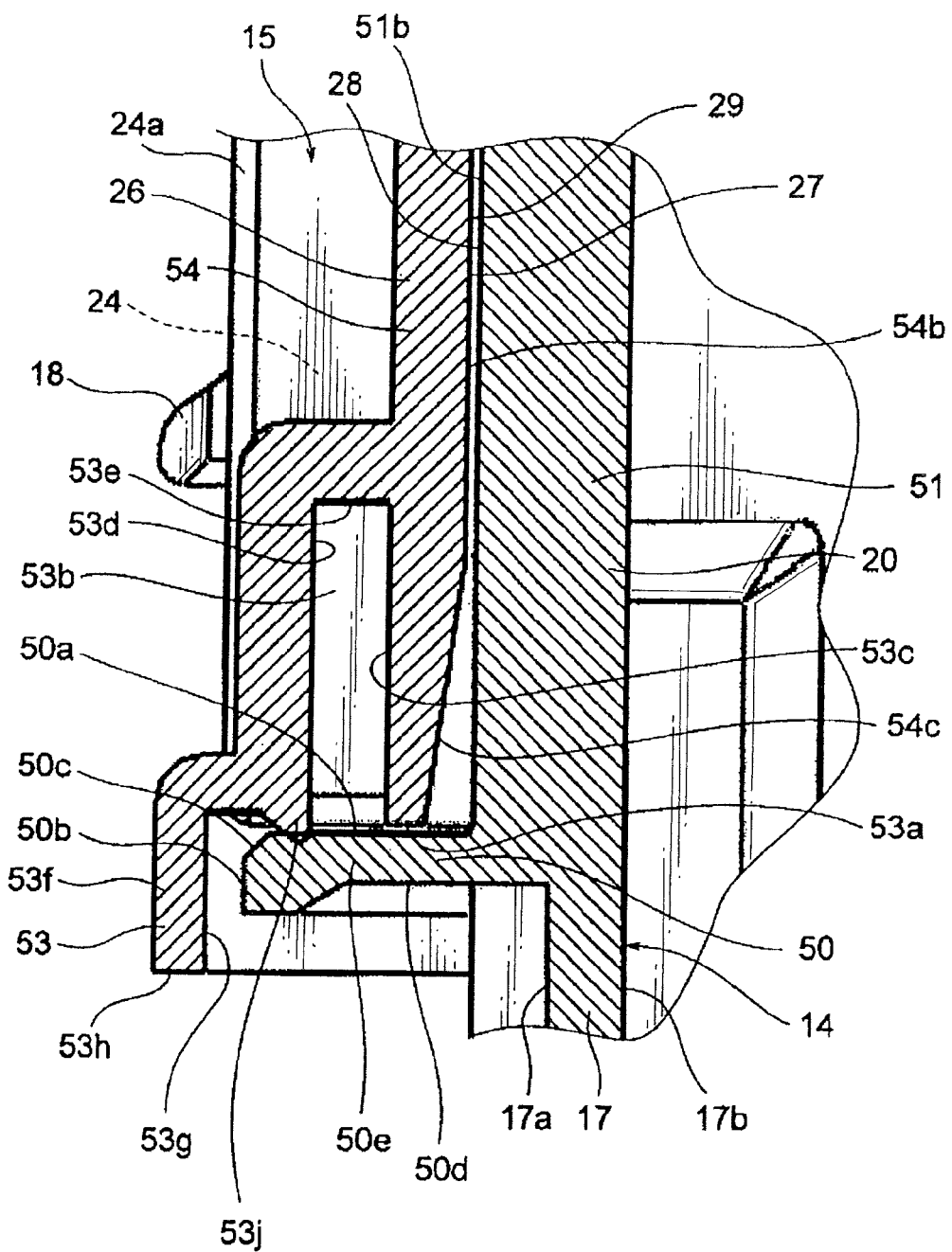
FIG. 12 An enlarged sectional view showing the second and first waterproof portions of FIG. 10.

Next, another embodiment of the waterproof structures at the main body side and the cover side will be explained with reference to FIGS. 9 to 12. FIG. 9 is a perspective view, and FIG. 10 is a sectional view. Further, FIG. 11 is an enlarged sectional view showing the third waterproof portion and the second waterproof portion of FIG. 10, and FIG. 12 is an enlarged sectional view showing the second waterproof portion and the first waterproof portion of FIG. 10. FIGS. 9 and 10 show a waterproof structure of a wall portion having the rotation support point as a representative example of the whole peripheral wall. Incidentally, only the waterproof structure portions at the main body side and at the cover side are different from the embodiment shown in FIGS. 3 to 8, and the other portions are the same (the same components are denoted by the same reference signs).

As shown in FIGS. 9 and 10, when the upper cover 15 is rotated with respect to the box main body 14, and they are in a locked state, the waterproof structure portions at the main body side 20 and at the cover side 26 are overlapped with each other.

The mating wall at the main body side 28 is formed on the waterproof structure portion at the main body side 20. Further, the mating wall at the cover side 29 is formed on the waterproof structure portion at the cover side 26. When the waterproof structure portions at the main body side 20 and at the cover side 26 are overlapped with each other, the mating walls at the main body side 28 and at the cover side 29 face each other. The tiny passage 27 is generated between them. Walls as components of the mating walls at the main body side 28 and at the cover side 29 will be described later.

In FIGS. 9 to 12, the waterproof structure portion at the main body side 20 is formed at the upper end portion of the peripheral wall 17 and works as a waterproof structure, and includes: a first waterproof portion 50 as an entrance side of the tiny passage 27; a second waterproof portion 51 as a middle of the tiny passage 27; and a third waterproof portion 52 as an exit side of the tiny passage 27. Hereinafter, the waterproof structure portion will be explained from the third waterproof portion 52.

The third waterproof portion 52 is disposed at the upper end of the peripheral wall 17. The third waterproof portion 52 is formed with the same thickness as the peripheral wall 17. The third waterproof portion 52 includes an upper wall 52*a* conforming to an upper end of the peripheral wall 17. This upper wall 52*a* is a component of the mating wall at the main body side 28. Further, an outer wall 52*b* extending perpendicular to the upper wall 52*a* is also a component of the mating wall at the main body side 28. The outer wall 52*b* is formed parallel to the inner wall 17*b* of the peripheral wall 17. The upper wall 52*a* includes a small chamfered portion 52*c* at a portion continued along the inner wall 17*b*. Further, the upper wall 52*a* also includes a chamfered portion 52*d* opposite to the chamfered portion 52*c*. A press-fit portion 52*e* projected outward is formed on the outer wall 52*b*. This press-fit portion 52*e* is a portion to generate a press-fit state. In this embodiment, the press-fit portion 52*e* is formed by arranging a plurality of ribs each having substantially triangle section in the upper-lower direction (the number of ribs of the press-fit portion 52*e* is one example).

The second waterproof portion 51 is arranged under the third waterproof portion 52. The second waterproof portion 51 has a wall which is substantially twice as thick as the third waterproof portion 52 (substantially twice as thick is one example). The second waterproof portion 51 is projected more outward than the third waterproof portion 52 because the second waterproof portion 51 is thicker than the third waterproof portion 52. An upper wall 511*a* of the second waterproof portion 51 is continued to the outer wall 52*b* of the third waterproof portion 52, and perpendicular to the outer wall 52*b*. Further, the upper wall 51*a* is formed parallel to the upper wall 52*a* of the third waterproof portion 52. The upper wall 51*a* is a component of the mating wall at the main body side 28. An outer wall 51*b* which is continued to and perpendicular to the upper wall 51*a* is formed longer than the outer wall 52*b* of the third waterproof portion 52. The outer wall 51*b* is formed parallel to the inner wall 17*b* of the peripheral wall 17. The outer wall 51*b* is a component of the mating wall at the main body side 28. A projection-shaped rotation support point 18 projected outward from the outer wall 51*b* is provided on a predetermined position of the outer wall 51*b*.

The first waterproof portion 50 is arranged under the second waterproof portion 51, and is projected further outward than the second waterproof portion 51. As such, a feature of the first waterproof portion 50 is to have a spring portion 50*e* elastically blocking an opening of a later-described blind passage 53*b*. An upper wall 50*a* of the first waterproof portion 50 is continued to and perpendicular to the outer wall 51*b* of the second waterproof portion 51. Further, the upper wall 50*a* is formed parallel to the upper wall 51*a* of the second waterproof portion 51. The upper wall 50*a* is formed longer than the upper wall 51*a* of the second waterproof portion 51. The upper wall 50*a* is a component of the mating wall at the main body side 28. An outer wall 50*b* continued to the upper wall 50*a* via a chamfered portion 50*c* is parallel to the inner wall 17*b* of the peripheral wall 17, and formed short in the upper-lower direction. The first waterproof portion 50 further includes a step-shaped lower wall 50*d*. For giving elasticity to the spring portion 50e, the first waterproof portion 50 is formed slim from the upper wall 50a to the lower wall 50d.

When view the above from the upper wall 52a of the third waterproof portion 52 to the outer wall 50b of the first waterproof portion 50 as components of the mating wall at the main body side 28 from a view of a cross-section of the waterproof structure portion at the main body side 20, the mating wall at the main body side 28 is formed in a terraced shape, namely, in a maze shape. Namely, the mating wall at the main body side 28 is formed in a shape so as to prevent water from entering.

In contrast, the waterproof structure portion at the cover side 26 is provided on a lower end of the cover peripheral wall 23 to waterproof, and includes: a first waterproof portion 53 as an entrance side of the tiny passage 27; a second waterproof portion 54 as a middle of the tiny passage 27; and a third waterproof portion 55 as an exit side of the tiny passage 27, and is formed in substantially a skirt shape opening outward. The first waterproof portion 53 is arranged corresponding to the first waterproof portion 50 of the waterproof structure portion at the main body side 20. Further, the second waterproof portion 54 is arranged corresponding to the second waterproof portion 51 of the waterproof structure portion at the main body side 20. Further, the third waterproof portion 55 is arranged corresponding to the third waterproof portion 52 of the waterproof structure portion at the main body side 20. Hereinafter, waterproof structure portion will be sequentially explained from the third waterproof portion 55.

The third waterproof portion 55 includes a blind passage 55a opened at a wall facing the upper wall 52a of the third waterproof portion 52 of the waterproof structure portion at the main body side 20 (a wall as a component of the mating wall at the cover side 29). The blind passage 55a is formed so that a lower side is open and an upper side is dead end, and has a desired sized space. The blind passage 55a includes: an inner wall 55b; an outer wall 55c parallel to the inner wall 55b; and a backside wall 55d connecting the inner wall 55b with the outer wall 55c. The inner wall 55b is arranged just over the inner wall 17b of the peripheral wall 17 of the box main body 14. The blind passage 55a is formed so that the inner wall 55b is arranged at a lower end of the cover peripheral wall 23. Incidentally, an arrangement of the blind passage 55a and an exit position of the tiny passage 27 is the same as those of the 35a shown in FIG. 6.

The third waterproof portion 55 includes a wall-shaped portion 55e continued to the blind passage 55a and extended downward and straight. This wall-shaped portion 55e includes an inner wall 55f facing the outer wall 52b of the third waterproof portion 52 of the waterproof structure portion at the main body side 20. The inner wall 55f is a component of the mating wall at the cover side 29. Further, the inner wall 55f is also formed as a portion where the press-fit portion 52e of the third waterproof portion 52 becomes a press-fit state. The inner wall 55f includes a small chamfered portion 55g at a portion continued to the second waterproof portion 51. (The chamfered portion 55g is also a component of the mating wall at the cover side 29.)

The second waterproof portion 54 is arranged under the third waterproof portion 55. The second waterproof portion 54 is a wall-shaped portion having a lower wall 54a facing the upper wall 51a of the second waterproof portion 51 of the waterproof structure portion at the main body side 20, and an inner wall 54b facing the outer wall 51b. The lower wall 54a is continued to the chamfered portion 55g of the third waterproof portion 55, and the inner wall 54b is continued to the lower wall 54a at this opposite side. The inner wall 54b is formed perpendicular to the lower well 54a, and extended downward and straight. This inner wall 54b includes a relatively large chamfered portion 54c at a portion continued to the first waterproof portion 53. The lower wall 54a, the inner wall 54b, and the chamfered portion 54c are components of the mating wall at the cover side 29.

The first waterproof portion 53 is arranged under the second waterproof portion 54, and includes a lower wall 53a facing the upper wall 50a of the first waterproof portion 50 of the waterproof structure portion at the main body side 20. The lower wall 53a is provided with a blind passage 53b opening at this position. The blind passage 53b is formed so that a lower side is open and an upper side is dead end, and has a desired sized space. The blind passage 53b includes: an inner wall 53c; an outer wall 53d parallel to the inner wall 53c; and a backside wall 53e connecting the inner wall 53c with the outer wall 53d. The inner wall 53c is formed perpendicular to the upper wall 50a of the first waterproof portion 50. An opening of the blind passage 53b is elastically blocked by the spring portion 50e (first waterproof portion 50). Reference sign 53j denotes a seal portion. This seal portion 53j is arranged so as to be continued to the opening and the outer wall 53d. The seal portion 53j is formed in a projection shape.

The first waterproof portion 53 includes a wall-shaped portion 53f continued to the blind passage 53b. This wall-shaped portion 53f includes an inner wall 53g. The inner wall 53g is formed so as to face the outer wall 50b of the first waterproof portion 50 of the waterproof structure portion at the main body side 20. The inner wall 33g is a component of the mating wall at the cover side 29. The first waterproof portion 53 includes a lower wall 53h as the most bottom end of the upper cover 15 other than the above described walls.

The rotation support point 24 provided on the waterproof structure portion at the cover side 26 includes: a through-hole (not shown) allowing the projection-shaped rotation support point 18 of the waterproof structure portion at the main body side 20 to insert; and a pair of protection walls 24a disposed at both sides of the through-hole. The pair of protection walls 24a are formed in a rib shape, and extended in the upper-lower direction.

In the above configuration and the above structure, when the high pressure cleaning is done, the water traveling toward the waterproof box 11 hits (the outer wall 17a of) the peripheral wall 17 of the box main body 14, and then the water moves upward along the peripheral wall 17. The water moving upward along the peripheral wall 17 presses against the lower wall 50d of the first waterproof portion 50 of the waterproof structure portion at the main body side 20, and the blind passage 53b is blocked by the first waterproof portion 50 working as the spring portion 50e (because the lower wall 50d is bitted by the high pressure cleaning water, the opening of the blind passage 53b is blocked, and the water is prevented from entering (passing) ahead of the entrance of the tiny passage 27).

Because an entrance of the tiny passage 27 is disposed away from the outer wall 17a of the peripheral wall 17 of the box main body 14, water is prevented from entering unless the cleaning water hits the entrance of the tiny passage 27 pinpoint hitting.

When the cleaning water hits the lower wall 53h of the first waterproof portion 53 of the upper cover 15 (the lower wall 53h as the lowest end of the upper cover 15), and the upper cover 15 is moved in the arrow S direction, namely, the upper cover 15 is blown upward, or even if the water enters the overlapped portion, the water enters the blind passage 53b, and the force of the water is reduced (even if the upper cover 15 is blown upward, the first waterproof portion 50 follows the upper cover 15, thereby blocking the opening of the blind passage 53b and the water is prevented from entering therein).

Further, if the water enters prior to the blind passage 53b, because the tiny passage 27 is formed in a maze shape having a plurality of steps (corners), and the third waterproof portion 52 includes the press-fit portion 52e, the water is prevented from entering the waterproof box due to the maze shape and the press-fit portion 52e.

Further, if the water enters prior to the press-fit portion 52e, the water enters the blind passage 55a, and the force of the water is reduced. The blind passage 55a works as a buffer, and the water of which force is reduced exits accordingly.

The exit of the tiny passage 27 is formed as small as possible. Therefore, the water entering the blind passage 55a and of which force is reduced is hard to exit. If the water exits the exit of the tiny passage 27, this water falls down along the inner wall 17b of the peripheral wall 17, and is drained off from a not-shown drain outlet of the lower cover 16.

As is understood from the above explanation of the present invention with reference to FIGS. 1 to 12, according to the present invention, the present invention increases the waterproof performance beyond that of the conventional waterproof box. Further, because the upper cover 15 can be attached and detached via a single action with one hand, e the workability is also increased beyond that of the conventional waterproof box and thus saves more space as well.

Of course, this invention can be practiced in various ways within a scope of the present invention.

REFERENCE SIGNS LIST 1 electrical junction box 1
2 vehicle
3 engine compartment
4 engine
5 battery
11 waterproof box
12, 13 functional component
14 box main body
15 upper cover (cover)
16 lower cover
17 peripheral wall
18 rotation support point
19 main-body lock
20 waterproof structure portion at the main body side
21 fitting portion
22 ceiling wall
23 cover peripheral wall
24 rotation support point
25 cover lock
26 waterproof structure portion at the cover side
27 tiny passage
28 mating wall at the main body side
29 mating wall at the cover side
30, 33 first waterproof portion
31, 34 second waterproof portion
32, 35 third waterproof portion
36, 37 exit standard
38 inner wall
39 tapered portion

The invention claimed is:

1. A waterproof box comprising:
a box main body having a peripheral wall and receiving components inside of the peripheral wall, the components being susceptive to moisture;
a cover having a cover peripheral wall and covering an opening provided at an edge of the peripheral wall of the main body;
a waterproof structure portion provided at the edge of the peripheral wall of the main body;
and a waterproof structure portion provided at an edge of the cover peripheral wall of the cover,
wherein the waterproof box is waterproofed by the waterproof structure portions of the main body and of the cover overlapped with each other, and
wherein the waterproof structure portion of the main body includes an outer wall of a first waterproof portion of the main body, the waterproof structure portion of the cover includes an inner wall of a first waterproof portion of the cover that comes into contact with the outer wall of the first waterproof portion, and face toward each other to form a tiny passage, and a plurality of blind passages are between the waterproof structure of the main body and the water proof structure of the cover, the plurality of blind passages each forming a space of a desired size,
wherein a second waterproof portion is disposed subsequent to the first waterproof portion and the third waterproof portion is formed subsequent to a second waterproof portion,
wherein the first waterproof portion is disposed at an entrance side of the tiny passage, and the third waterproof portion is disposed at an exit side of the tiny passage, and
wherein the first waterproof portion and the second waterproof portion are made up of at least a space defined between two vertical surfaces and two horizontal surfaces.

2. The waterproof box as claimed in claim 1,
wherein rotation support points for making the cover rotatable and detachable relative to the box main body are provided on the waterproof structure portions of the main body and of the cover.

3. The waterproof box as claimed in claim 1,
wherein an entrance side of the tiny passage is disposed outward from an outer peripheral wall of the box main body.

4. The waterproof box as claimed in claim 2,
wherein an entrance side of the tiny passage is disposed outward from an outer peripheral wall of the box main body.

5. The waterproof box as claimed in claim 1,
wherein a spring elastically closing an opening of each of the plurality of blind passages is provided on the waterproof structure portion of the main body.

6. The waterproof box as claimed in claim 2,
wherein a spring elastically blocking an opening of each of the plurality of blind passages is provided on the waterproof structure portion of the main body.

7. The waterproof box as claimed in claim 1,
wherein a press-fit portion generating a fitting state is formed by arranging a plurality of ribs each having substantially triangle section in an upper-lower direction.

8. The waterproof box as claimed in claim 2,
wherein a press-fit portion generating a fitting state is formed by arranging a plurality of ribs each having substantially triangle section in an upper-lower direction.

9. The waterproof box as claimed in claim 3,
wherein a press-fit portion generating a fitting state is formed by arranging a plurality of ribs each having substantially triangle section in an upper-lower direction.

10. The waterproof box as claimed in claim 4,
wherein a press-fit portion generating a fitting state is formed by arranging a plurality of ribs each having substantially triangle section in an upper-lower direction.

11. The waterproof box as claimed in claim 5,
wherein a press-fit portion generating a fitting state is formed by arranging a plurality of ribs each having substantially triangle section in an upper-lower direction.

12. The waterproof box as claimed in claim 6,
wherein a press-fit portion generating a fitting state is formed by arranging a plurality of ribs each having substantially triangle section in an upper-lower direction.

13. The waterproof box of claim 1, wherein a middle of the tiny passage is within the second waterproof section and an exit of the tiny passage is within the third waterproof section.

14. The waterproof box of claim 1, wherein the third waterproof portion includes a second blind passage of the plurality of blind passages.

15. The waterproof box of claim 1, wherein a chamfered portion is formed in a middle portion of the tiny passage.

16. The waterproof box of claim 1, wherein the second waterproof portion is recessed in relation to the first waterproof portion and the third waterproof portion is recessed in relation to the second waterproof portion to form a step shape edge on the waterproof box.

17. The waterproof box of claim 1, wherein the tiny passage is formed in a maze shape having at least one step.

\* \* \* \* \*